United States Patent
Eser et al.

(10) Patent No.: US 12,510,173 B2
(45) Date of Patent: Dec. 30, 2025

(54) MIXING VALVE

(71) Applicant: Vitesco Technologies GmbH, Regensburg (DE)

(72) Inventors: Gerhard Eser, Hemau (DE); Sebastian Brettner, Burglengenfeld (DE); Manuel Dillinger, Kelheim (DE); Markus Feulner, Ensdorf (DE); Mitchell Koupal, Pontiac, MI (US)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/067,007

(22) Filed: Dec. 15, 2022

(65) Prior Publication Data
US 2023/0120643 A1  Apr. 20, 2023

Related U.S. Application Data

(63) Continuation of application No. PCT/EP2021/065245, filed on Jun. 8, 2021.

(51) Int. Cl.
*F16K 11/087* (2006.01)
*F01P 7/16* (2006.01)
(Continued)

(52) U.S. Cl.
CPC ............ *F16K 11/0876* (2013.01); *F01P 7/16* (2013.01); *F16K 11/076* (2013.01);
(Continued)

(58) Field of Classification Search
CPC .. F16K 11/0876; F16K 11/076; F16K 11/087; F01P 7/16; F01P 2007/146; Y10T 137/86107; Y10T 137/87249
See application file for complete search history.

(56) References Cited

U.S. PATENT DOCUMENTS 1,422,178 A * 7/1922 Cooley ............... F16K 11/0853
  251/297
1,807,085 A * 5/1931 Crickmer ............ F16K 11/0853
  137/625.47
(Continued)

FOREIGN PATENT DOCUMENTS

CN  2066921 U  10/1989
CN  205896279 U  1/2017
(Continued)

OTHER PUBLICATIONS

International Search Report and Written Opinion dated Sep. 16, 2021 from corresponding International Patent Application No. PCT/EP2021/065245.
(Continued)

*Primary Examiner* — Craig M Schneider
*Assistant Examiner* — Christopher D Ballman

(57) ABSTRACT

A mixing valve has a housing with a first inlet, a second inlet, a first outlet and a second outlet, and has a valve element arranged adjustably in the housing, and which valve element has a first fluid passage which, in a first position of the valve element, connects the first inlet and first outlet, in a second position of the valve element, connects the first inlet and second outlet, and in a third position of the valve element, connects the first inlet to the first outlet and second outlet, and which valve element has a second fluid passage which, in the first position of the valve element, connects the second inlet and second outlet, in the second position of the valve element, connects the second inlet and first outlet, and, in the third position of the valve element, connects the second inlet to the first outlet and second outlet.

16 Claims, 6 Drawing Sheets

(51) Int. Cl.
*F16K 11/076* (2006.01)
*F01P 7/14* (2006.01)

(52) U.S. Cl.
CPC ....... *F16K 11/087* (2013.01); *F01P 2007/146* (2013.01); *Y10T 137/86107* (2015.04); *Y10T 137/87249* (2015.04)

(56) References Cited

U.S. PATENT DOCUMENTS

| | | | | |
|---|---|---|---|---|
| 2,996,083 | A * | 8/1961 | Huska | F16K 11/085 137/625.11 |
| 3,499,467 | A * | 3/1970 | Lang, Jr. | F16K 11/0836 137/625.19 |
| 3,927,693 | A * | 12/1975 | Johnston | F16K 11/0853 137/625.47 |
| 4,566,628 | A * | 1/1986 | Latarius | F16K 11/0853 137/630.2 |
| 4,842,016 | A * | 6/1989 | McKenzie | F16K 11/044 251/85 |
| 4,907,739 | A * | 3/1990 | Drake | F24D 3/1066 236/12.11 |
| 4,989,641 | A * | 2/1991 | Jones | F16K 31/52466 251/188 |
| 5,057,214 | A * | 10/1991 | Morris | B01D 29/668 210/278 |
| 5,529,758 | A * | 6/1996 | Houston | F16K 11/0853 422/171 |
| 5,588,503 | A * | 12/1996 | Rinaldo | F16N 13/20 184/6 |
| 6,006,776 | A * | 12/1999 | Dill | F16K 11/07 417/286 |
| 6,539,899 | B1 * | 4/2003 | Piccirilli | F01P 7/167 123/41.1 |
| 7,563,019 | B2 * | 7/2009 | Buchholz | B01F 25/23 366/162.4 |
| 7,669,416 | B2 * | 3/2010 | Pantow | F02B 29/0443 60/599 |
| 9,383,032 | B1 * | 7/2016 | Bhatasana | G01M 3/2876 |
| 9,404,594 | B2 | 8/2016 | Morein | |
| 9,500,299 | B2 | 11/2016 | Zammuto | |
| 9,958,074 | B2 * | 5/2018 | Wan | E21B 34/00 |
| 9,958,082 | B2 * | 5/2018 | Yu | F16K 31/041 |
| 10,344,877 | B2 * | 7/2019 | Roche | B60L 1/003 |
| 10,544,903 | B2 * | 1/2020 | Ikeda | F17C 13/04 |
| 10,865,668 | B2 * | 12/2020 | Wong | F01L 7/02 |
| 10,883,619 | B2 * | 1/2021 | Smith | F16K 27/065 |
| 11,002,375 | B2 * | 5/2021 | Marchand | F16K 11/0712 |
| 11,168,797 | B2 * | 11/2021 | Dragojlov | F16K 31/535 |
| 11,255,450 | B2 * | 2/2022 | Ledvora | F16K 5/0471 |
| 11,892,087 | B2 * | 2/2024 | Esaki | F16K 5/0407 |
| 2004/0221901 | A1 * | 11/2004 | Chen | F16K 11/0853 137/625.23 |
| 2006/0237359 | A1 * | 10/2006 | Lin | F16K 11/085 210/438 |
| 2014/0090414 | A1 * | 4/2014 | McLane | F16K 5/0471 62/115 |
| 2015/0354716 | A1 * | 12/2015 | Morein | F16K 11/0853 137/625.47 |
| 2019/0368621 | A1 | 12/2019 | Marchand | |
| 2022/0025978 | A1 | 1/2022 | Dragojlov | |

FOREIGN PATENT DOCUMENTS

| | | |
|---|---|---|
| CN | 207634745 U | 7/2018 |
| CN | 109424766 A | 3/2019 |
| DE | 102015201242 A1 | 7/2016 |
| DE | 102018214174 A1 | 2/2019 |
| DE | 102019114645 A1 | 12/2019 |
| JP | S6138274 U | 3/1986 |
| JP | H1182769 A | 9/1997 |
| JP | 2018100682 A | 6/2018 |
| WO | 20090137822 A1 | 1/2009 |

OTHER PUBLICATIONS

German Search Report dated Apr. 6, 2021 for corresponding German Patent Application No. 10 2020 207 925.0.

Chinese Office Action Dated dated May 21, 2025 for corresponding Patent Application No. 202180044018.X.

* cited by examiner

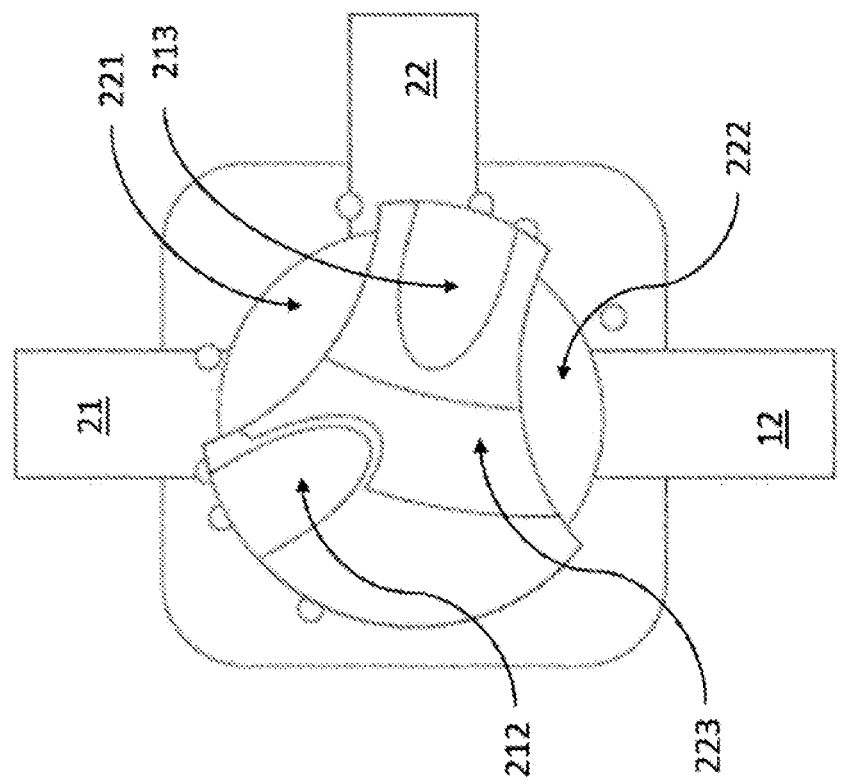

MIXING VALVE

CROSS-REFERENCE TO RELATED APPLICATIONS

This application claims priority to PCT Application PCT/EP2021/065245, filed Jun. 8, 2021, which claims priority to German Patent Application No. DE 10 2020 207.925.0, filed Jun. 25, 2020. The disclosures of the above applications are incorporated herein by reference.

FIELD OF THE INVENTION

The present invention relates to a mixing valve for a heat transport medium circuit and/or a motor vehicle, to a heat transport medium circuit and to a motor vehicle having the mixing valve, and to a method for selectively connecting inlets and outlets of the mixing valve.

SUMMARY OF THE INVENTION

It is an object of the present invention to improve a valve.

This object is achieved by a mixing valve having the features described herein. Also described is a heat transport medium circuit, and for a motor vehicle having a mixing valve or heat transport medium circuit described herein, and for a method for operating such a mixing valve. Other embodiments relate to various developments.

According to one embodiment of the present invention, a mixing valve has a housing with a first inlet, with a second inlet, with a first outlet and with a second outlet, and has a valve element, such as a valve body, which valve element is arranged adjustably, in one embodiment rotatably about a (virtual) axis of rotation, in one refinement through at least 30°, in one embodiment through at least 45°, in one refinement continuously or through more than 360°, at least partially in the housing, and which valve element has:
  a) a first single-channel or multi-channel fluid passage which,
    i) in a first position of the valve element, connects the first inlet to the first outlet,
    ii) in a second position of the valve element, connects the first inlet to the second outlet, and
    iii) in a third position of the valve element, connects the first inlet to the first outlet and to the second outlet; and
  b) a second single-channel or multi-channel fluid passage which,
    i) in the first position of the valve element, connects the second inlet to the second outlet,
    ii) in the second position of the valve element, connects the second inlet to the first outlet; and
    iii) in the third position of the valve element, which in one embodiment is situated between the first and second positions, connects the second inlet to the first outlet and to the second outlet.

In one embodiment,
  a) in the first position of the valve element,
    only the first inlet is connected to the first outlet and the second inlet is connected to the second outlet, or
    the first inlet is not connected to the second outlet, the second inlet is not connected to the first outlet, and the first inlet is not connected to the second inlet, or
    the first inlet is separated from the second inlet and outlet, and the second inlet is separated from the first outlet; and/or,
  b) in the second position of the valve element, only the first inlet is connected to the second outlet and the second inlet is connected to the first outlet, or
    the first inlet is not connected to the first outlet, the second inlet is not connected to the second outlet, and the first inlet is not connected to the second inlet, or
    the first inlet is separated from the first outlet and from the second inlet, and the second inlet is separated from the second outlet.

In this way, in one embodiment, not only are a separation and a series connection or criss-crossing connection of fluid flows made possible, but mixing of the fluid flows is additionally made possible. In one embodiment, the mixing valve is a fluid valve, in one refinement a valve for selective separation, series connection and criss-crossing connection and mixing of liquids.

In one embodiment, a minimum cross section, through which flow may pass, between the first inlet and the first outlet is smaller in the third position of the valve element than in the first position of the valve element, and in one refinement is greater than zero in the third position of the valve element. As discussed above, in one embodiment, a minimum cross section, through which flow may pass, between the first inlet and the first outlet is zero in the second position of the valve element.

Additionally or alternatively, in one embodiment, a minimum cross section, through which flow may pass, between the first inlet and the second outlet is smaller in the third position of the valve element than in the second position of the valve element, and in one refinement is greater than zero in the third position of the valve element. As discussed above, in one embodiment, a minimum cross section, through which flow may pass, between the first inlet and the second outlet is zero in the first position of the valve element.

Additionally or alternatively, in one embodiment, a minimum cross section, through which flow may pass, between the second inlet and the second outlet is smaller in the third position of the valve element than in the first position of the valve element, and in one refinement is greater than zero in the third position of the valve element. As discussed above, in one embodiment, a minimum cross section, through which flow may pass, between the second inlet and the second outlet is zero in the second position of the valve element.

Additionally or alternatively, in one embodiment, a minimum cross section, through which flow may pass, between the second inlet and the first outlet is smaller in the third position of the valve element than in the second position of the valve element, and in one refinement is greater than zero in the third position of the valve element. As discussed above, in one embodiment, a minimum cross section, through which flow may pass, between the second inlet and the first outlet is zero in the first position of the valve element.

In this way, in one embodiment, mixing of fluid flows is made possible.

In one embodiment, in a fourth position of the valve element, the first fluid passage connects the first inlet to the first outlet and to the second outlet, and the second fluid passage connects the second inlet to the first outlet and to the second outlet.

In one embodiment, a minimum cross section, through which flow may pass, between the first inlet and the first outlet is smaller in the fourth position of the valve element than in the first and third positions of the valve element, and in one refinement is greater than zero.

Additionally or alternatively, in one embodiment, a minimum cross section, through which flow may pass, between the first inlet and the second outlet is smaller in the fourth position of the valve element than in the second position of the valve element and greater in the fourth position of the valve element than in the third position of the valve element, and in one refinement is greater than zero in the fourth position of the valve element.

Additionally or alternatively, in one embodiment, a minimum cross section, through which flow may pass, between the second inlet and the second outlet is smaller in the fourth position of the valve element than in the first and third positions of the valve element, and in one refinement is greater than zero in the fourth position of the valve element.

Additionally or alternatively, in one embodiment, a minimum cross section, through which flow may pass, between the second inlet and the first outlet is smaller in the fourth position of the valve element than in the second position of the valve element and greater in the fourth position of the valve element than in the third position of the valve element, and in one refinement is greater than zero in the fourth position of the valve element.

In this way, in one embodiment, different or variable mixing of fluid flows is made possible.

In one embodiment, in a further position of the valve element, the first fluid passage connects the first inlet only to the first outlet, and the second fluid passage connects the second inlet to the first outlet and to the second outlet.

Additionally or alternatively, in one embodiment, in a further position of the valve element, the first fluid passage connects the first inlet only to the second outlet, and the second fluid passage connects the second inlet to the first outlet and to the second outlet.

Additionally or alternatively, in one embodiment, in a further position of the valve element, the first fluid passage connects the first inlet to the first outlet and to the second outlet, and the second fluid passage connects the second inlet only to the first outlet.

Additionally or alternatively, in one embodiment, in a further position of the valve element, the first fluid passage connects the first inlet to the first outlet and to the second outlet, and the second fluid passage connects the second inlet only to the second outlet.

In this way, in one embodiment, different or variable mixing of fluid flows is made possible.

In one embodiment, the valve element is adjustable or adjusted, or is rotatable or rotated, in continuous or continuously variable fashion between at least two of the positions mentioned herein, in one refinement reversibly from the first position into the third position or fourth position or (one of the) further position(s), from the second position into the fourth position or third position or (one of the) further position(s), and/or from the third position into the fourth position or (one of the) further position(s).

In one embodiment, aside from the positions mentioned here, the valve element also has several, in one embodiment an infinite number of, intermediate positions, which may transition into one another in continuous fashion. In one embodiment, the valve element is adjustable or adjusted, or is rotatable or rotated, in continuous or continuously variable fashion, and in the process, in one embodiment, successively passes through one or more of the positions mentioned here.

In this way, in one embodiment, mixing of fluid flows with low losses and/or little shock, is made possible.

In one embodiment, the first fluid passage has a ramification with a first branch which, in the first, second and third positions of the valve element, in one refinement in the first, second, third and fourth positions of the valve element, is connected to the first inlet, with a second branch which, in the first and third positions of the valve element, in one refinement in the first, third and fourth positions of the valve element, is connected to the first outlet, and with a third branch which, in the second and third positions of the valve element, in one refinement in the second, third and fourth positions of the valve element, is connected to the second outlet.

Additionally or alternatively, in one embodiment, an outer surface of the valve element has a first cutout, which in one refinement is of groove-like form.

In one refinement, in the third position, in one embodiment in the third and fourth positions, of the valve element, the first cutout connects the two inlets to one another, connects the two outlets to one another, or connects at least one of the inlets and at least one of the outlets to one another.

In one embodiment, in the third position, in one embodiment in the third and fourth positions, the first cutout in each case at least partially coincides with or overlaps the two inlets, the two outlets, or the at least one inlet and at least one outlet.

Additionally or alternatively, in one embodiment, the first cutout is connected by a through passage to a second cutout, which in one refinement is of groove-like form and which in turn, in at least one, in one embodiment further, position of the valve element, connects the two inlets to one another, connects the two outlets to one another, or connects at least one of the inlets and at least one of the outlets to one another.

In one embodiment, in the at least one (further) position, the second cutout in each case at least partially coincides with or overlaps the two inlets, the two outlets, or the at least one inlet and at least one outlet.

Additionally or alternatively, in one embodiment, at least one portion of an outer surface of the valve element, in one refinement a portion with an opening, such as an inlet opening, of the first branch and/or a portion with an opening, such as an outlet opening, of the second branch and/or a portion with an opening, such as an outlet opening, of the third branch and/or a portion with the first cutout and/or a portion with the second cutout, is of rotationally symmetrical, in one embodiment spherical-segment-shaped form.

In this way, it is possible in each case, through combination of two or more of the above-stated features, to realize a mixing valve, which in one embodiment is compact, is reliable, is easily adjustable and/or exhibits low flow resistance.

In one embodiment, the two inlets are offset with respect to one another, in one refinement by at least 45°, in one embodiment by at least 90°, in a direction of rotation about an axis of rotation of the valve element. In one embodiment, the inlets are arranged in a plane.

Additionally or alternatively, in one embodiment, the two outlets are offset with respect to one another, in one refinement by at least 45°, in one embodiment by at least 90°, in a direction of rotation about an axis of rotation of the valve element. In one embodiment, the outlets are arranged in a plane.

Additionally or alternatively, in one embodiment, at least one of the inlets and at least one of the outlets are offset with respect to one another, in one refinement by at least 45°, in one embodiment by at least 90°, in a direction of rotation about an axis of rotation of the valve element. In one embodiment, the at least one inlet and at least one outlet are arranged in a plane.

Additionally or alternatively, in one embodiment, the two inlets are offset with respect to one another, in one refinement by at least 45°, in one embodiment by at least 60°, in one embodiment by at least 85°, in a direction of revolution about an offset axis that is perpendicular to the axis of rotation of the valve element.

Additionally or alternatively, in one embodiment, the two outlets are offset with respect to one another, in one refinement by at least 45°, in one embodiment by at least 60°, in one embodiment by at least 85°, in a direction of revolution about an offset axis that is perpendicular to the axis of rotation of the valve element.

Additionally or alternatively, in one embodiment, at least one of the inlets and at least one of the outlets are offset with respect to one another, in one refinement by at least 45°, in one embodiment by at least 60°, in one embodiment by at least 85°, in a direction of revolution about an offset axis that is perpendicular to the axis of rotation of the valve element.

Additionally or alternatively, in one embodiment, the (virtual or kinematic) axis of rotation of the valve element passes through at least one of the inlets and/or at least one of the outlets.

In this way, it is possible in each case, through combination of two or more of the above-stated features, to realize a mixing valve, which in one embodiment is compact, is reliable, is easily adjustable and/or exhibits low flow resistance.

The mixing valve may, owing to the structural, thermal, fluid mechanical and/or control-related boundary conditions, be used for or in a heat transport medium circuit and/or motor vehicle, such as a passenger motor vehicle, that is to say for or in a motor vehicle heat transport medium circuit, but without being limited to this.

In one embodiment of the present invention, a motor vehicle, such as a passenger motor vehicle, or a heat transport medium circuit, has at least one mixing valve described here, a first partial circuit, which is connected to the first inlet and to the first outlet of the mixing valve, and a second partial circuit, which is connected to the second inlet and to the second outlet of the mixing valve. In one embodiment, the motor vehicle has the heat transport medium circuit with the mixing valve.

Thus, in one embodiment, it is possible in or by the mixing valve for the first and second partial circuits to be separated from one another or connected in series, or for a proportion of the heat transport medium flowing through the first partial circuit to be branched off therefrom into the second partial circuit and for a proportion of the heat transport medium flowing through the second partial circuit to be returned therefrom into the first partial circuit.

In one embodiment, "connect" or "connected" means "fluidically connect" or "fluidically connected".

BRIEF DESCRIPTION OF THE DRAWINGS

Further features will emerge from the exemplary embodiments. In this respect, in part schematically:

FIG. 5E shows a section corresponding to FIGS. 5A-5D with the valve element in a further position.

DETAILED DESCRIPTION OF THE PREFERRED EMBODIMENT

The following description of the preferred embodiment(s) is merely exemplary in nature and is in no way intended to limit the invention, its application, or uses.

Figure 2:
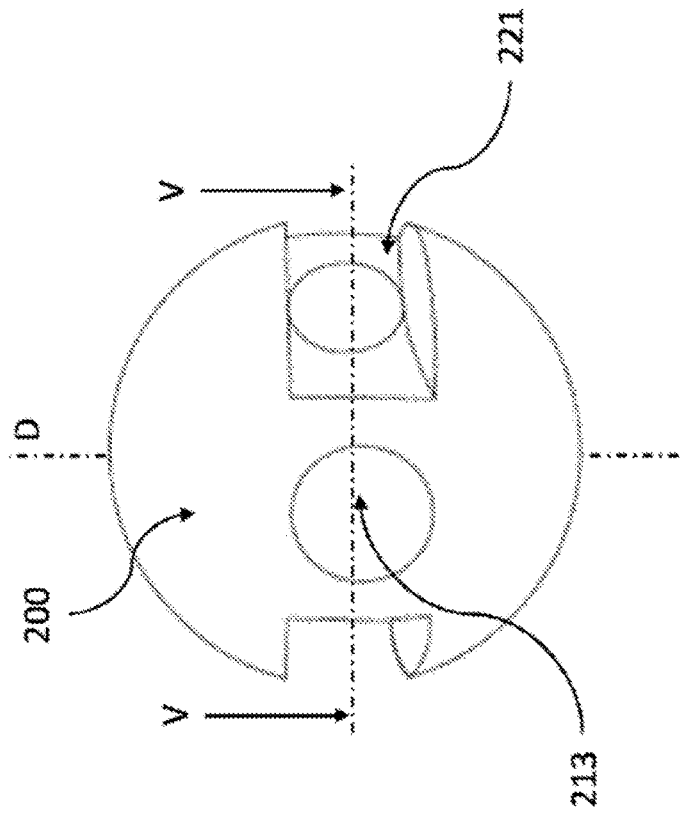
FIG. 2 shows a valve element of the mixing valve in a perspective view.
Figure 1:
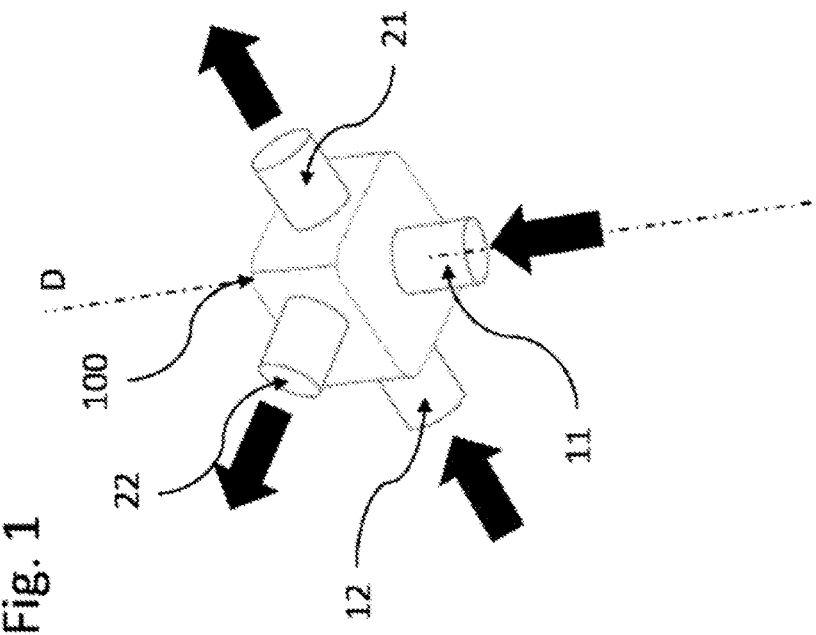
FIG. 1 shows a mixing valve according to an embodiment of the present invention in a perspective view.
Figure 4:
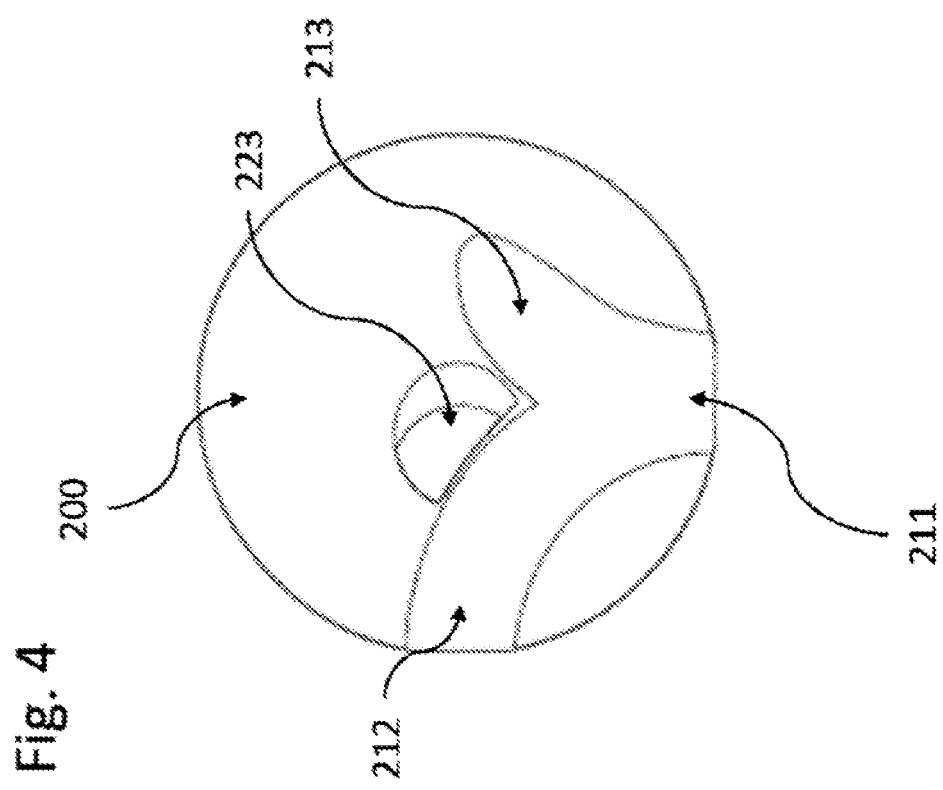
FIG. 4 shows a perspective partial section through the valve element in a section plane that is perpendicular to the plane of FIGS. 3 and 5.
Figure 3:
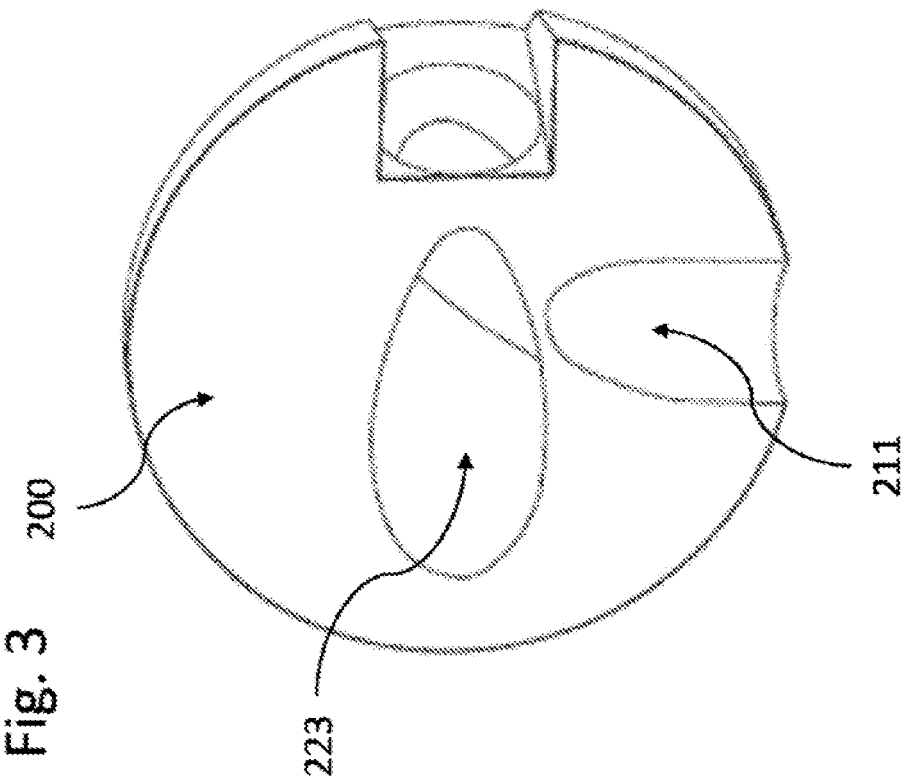
FIG. 3 shows a perspective partial section through the valve element in a section plane that is perpendicular to the plane of FIG. 5.

FIG. 1 shows a mixing valve according to an embodiment of the present invention in a perspective view.

The mixing valve has a housing 100 with a first inlet 11, with a second inlet 12, with a first outlet 21 and with a second outlet 22, and has a spherical valve element 200 which is arranged rotatably in the housing (cf. FIG. 5) and which has a first fluid passage 211-213 and a second fluid passage 221-223.

Seals between housing 100 and valve element 200 are denoted by 300. In a modification that is not illustrated, one or more of these seals 300 may also be omitted.

Figure 5A:
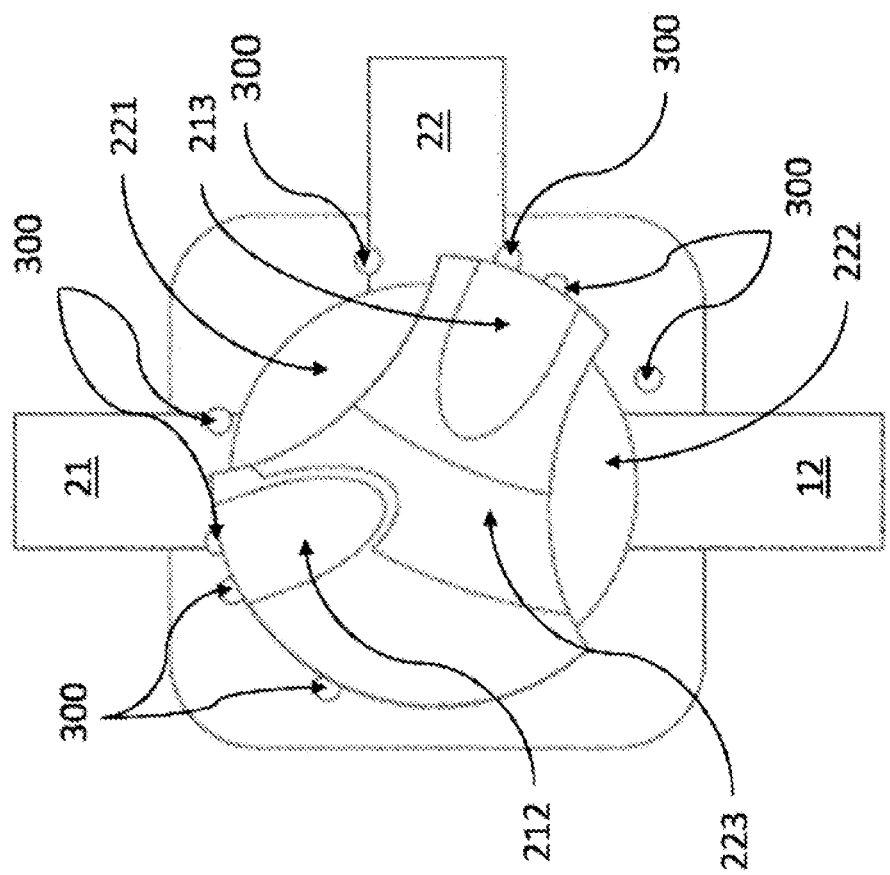
FIG. 5A shows a section through the mixing valve along the line V-V in FIG. 2 with the valve element in a first position.
Figure 5C:
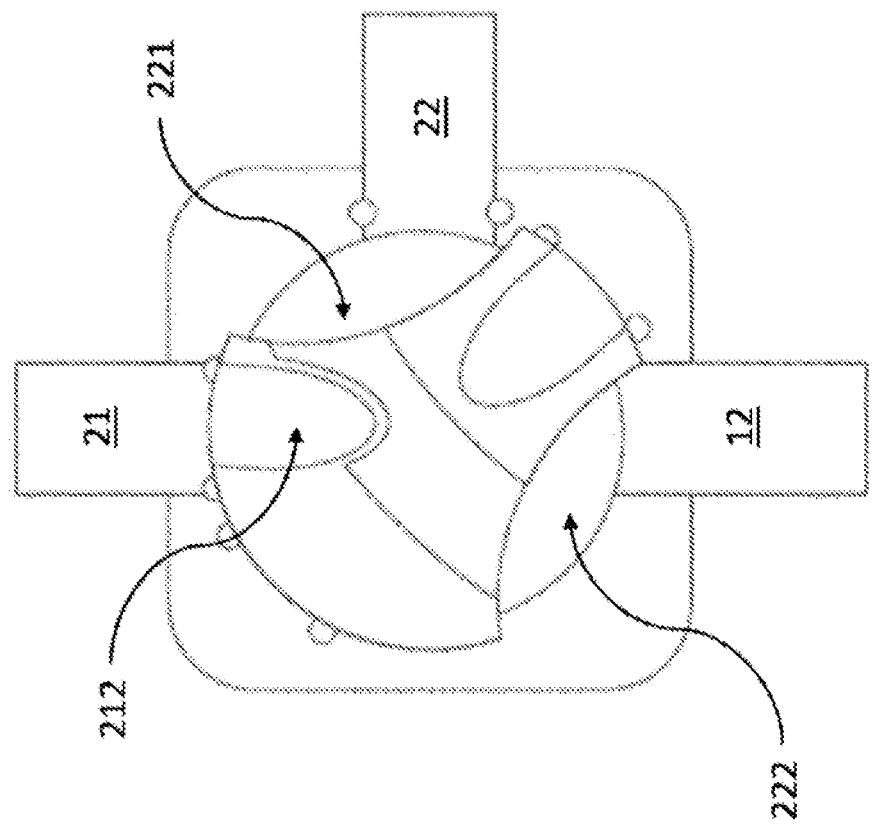
FIG. 5C shows a section corresponding to FIGS. 5A and 5B with the valve element in a third position.
Figure 5B:
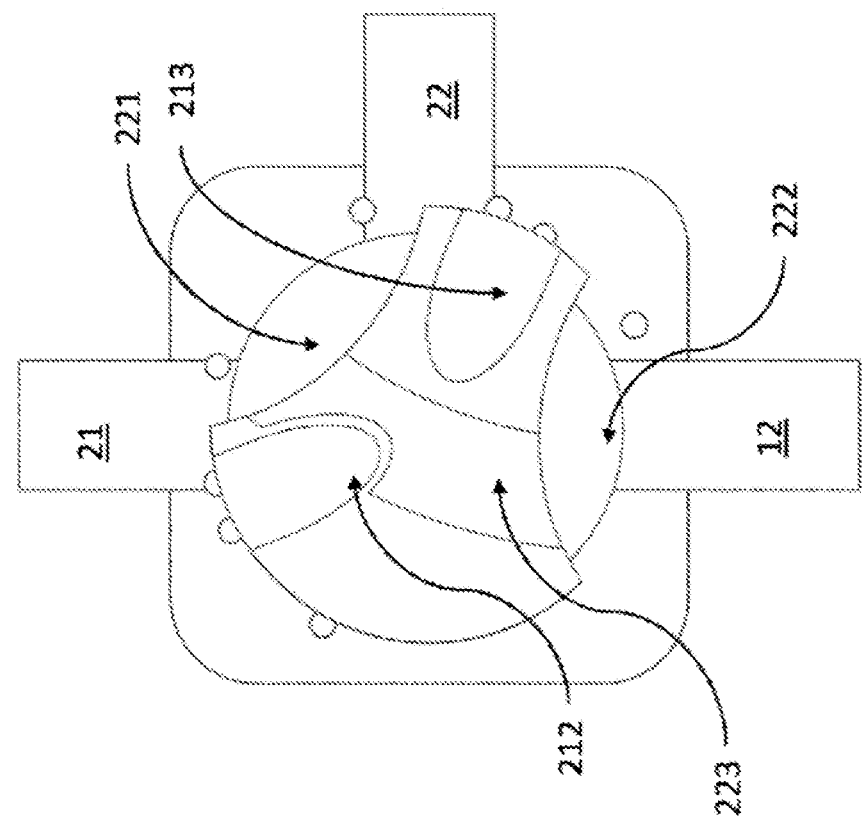
FIG. 5B shows a section corresponding to FIG. 5A with the valve element in a second position.
Figure 5D:
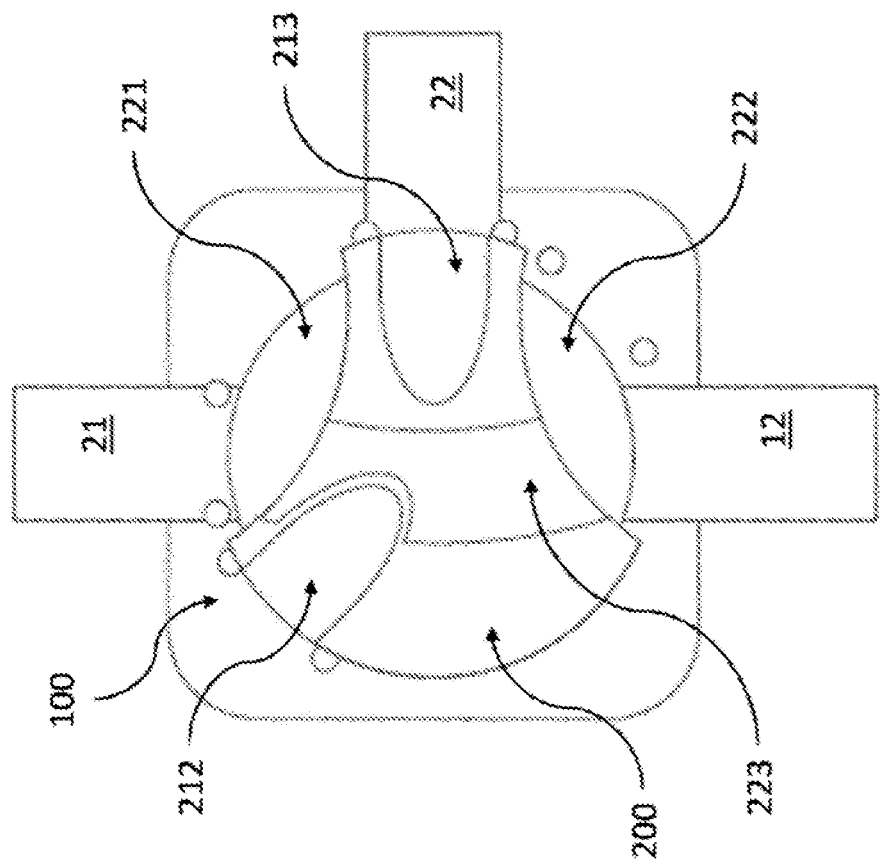
FIG. 5D shows a section corresponding to FIGS. 5A-5C with the valve element in a fourth position.
Figure 6:
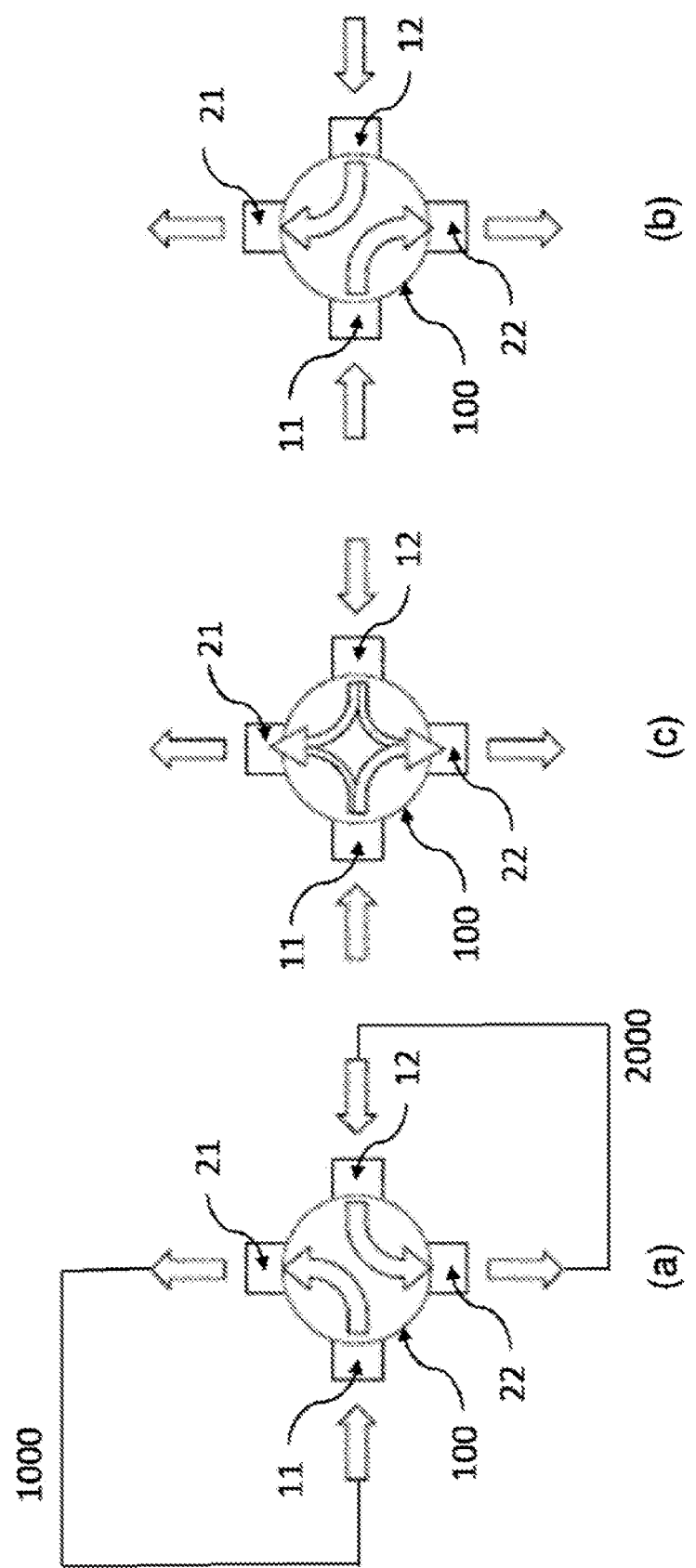
FIG. 6 shows a functional principle of the mixing valve.

The first fluid passage 211-213 connects the first inlet 11 to the first outlet 21 in a first position of the valve element (cf. FIGS. 5A and 6(*a*)), connects the first inlet 11 to the second outlet 22 in a second position of the valve element (cf. FIGS. 5B and 6(*b*)), and connects the first inlet 11 respectively to the first outlet 21 and to the second outlet 22 in a third position of the valve element (cf. FIGS. 5C, 6(*c*)) and in a fourth position of the valve element (cf. FIG. 5D).

The second fluid passage 221-223 connects the second inlet 12 to the second outlet 22 in the first position of the valve element, connects the second inlet 12 to the first outlet 21 in the second position of the valve element, and connects the second inlet 12 respectively to the first outlet 21 and to the second outlet 22 in the third and fourth positions of the valve element (cf. FIG. 5D).

The first fluid passage has a ramification with a first branch 211, which is connected to the first inlet 11 in the first, second, third and fourth positions of the valve element, with a second branch 212, which is connected to the first outlet 21 in the first, third and fourth positions of the valve element and is not connected to the first outlet 21 in the second position of the valve element, and with a third branch 213, which is connected to the second outlet 22 in the second, third and fourth positions of the valve element and is not connected to the second outlet 22 in the first position of the valve element.

The outer surface of the valve element has a groove-like first cutout 221 which, in the third and fourth positions of the valve element, connects the two outlets 21, 22 to one another, the first cutout 221 coinciding or overlapping with each of the two outlets 21, 22.

The outer surface of the valve element has a groove-like second cutout 222. If the valve element is rotated further counterclockwise proceeding from its second position shown in FIG. 5B, then, in some of these further positions that arise here (not illustrated), the second cutout 222 connects the second inlet 12 and the second outlet 22, or the two outlets 21, 22, likewise with a varying minimum cross section, through which flow may pass, between these, wherein the second cutout 222 then coincides or overlaps with each of the second inlet and outlet 12, 22.

A curved through passage 223 connects the first and second cutouts 221, 222 to one another.

The second inlet 12 and the second outlet 22, and the second and first outlets 22, 21, are in each case arranged so as to be offset with respect to one another by 90° in a direction of rotation about an axis of rotation D of the valve element, which is perpendicular to the plane of the drawing in FIG. 5, and in a common plane.

The first inlet 11 and the second inlet 12, the first inlet 11 and the first outlet 21, and the first inlet 11 and the second outlet 22, are in each case offset with respect to one another by 90° in a direction of revolution about an offset axis that is perpendicular to the axis of rotation D of the valve element, the axis of rotation D of the valve element passing through the first inlet 11, which is concealed by the valve element 200 in FIG. 5 or is situated behind the plane of the drawing in FIG. 5.

A minimum cross section, through which flow may pass, between the first inlet 11 and the first outlet 21 is smaller in the third position of the valve element (cf. FIG. 5C) than in the first position of the valve element (cf. FIG. 5A), and a minimum cross section, through which flow may pass, between the first inlet 11 and the second outlet 22 is smaller in the third position of the valve element (cf. FIG. 5C) than in the second position of the valve element (cf. FIG. 5B).

A minimum cross section, through which flow may pass, between the second inlet 12 and the second outlet 22 is smaller in the third position of the valve element (cf. FIG. 5C) than in the first position of the valve element (cf. FIG. 5A), and a minimum cross section, through which flow may pass, between the second inlet 12 and the first outlet 21 is smaller in the third position of the valve element (cf. FIG. 5C) than in the second position of the valve element (cf. FIG. 5B).

A minimum cross section, through which flow may pass, between the first inlet 11 and the first outlet 21 is smaller in the fourth position of the valve element (cf. FIG. 5D) than in the first and third positions of the valve element of the valve element; a minimum flow cross section, through which flow may pass, between the first inlet 11 and the second outlet 22 is smaller in the fourth position of the valve element (cf. FIG. 5D) than in the second position of the valve element and is greater in the fourth position of the valve element (cf. FIG. 5D) than in the third position of the valve element; a minimum cross section, through which flow may pass, between the second inlet 12 and the second outlet 22 is smaller in the fourth position of the valve element (cf. FIG. 5D) than in the first and third positions of the valve element; and a minimum cross section, through which flow may pass, between the second inlet 12 and the first outlet 21 is smaller in the fourth position of the valve element (cf. FIG. 5D) than in the second position of the valve element and is greater in the fourth position of the valve element (cf. FIG. 5D) than in the third position of the valve element.

FIG. 5E shows a further position of the valve element in an illustration corresponding to FIGS. 5A-D.

In this further position, the first fluid passage 211-213 connects the first inlet 11 only to the second outlet 22, and the second fluid passage 221-223 connects the second inlet 12 to the first outlet 21 and to the second outlet 22.

As illustrated in FIGS. 5A-5E, the valve element may be adjusted in continuous fashion, and in the process passes through the positions shown here.

FIG. 6(a) depicts a heat transport medium circuit having a mixing valve, having a first partial circuit 1000, which is connected to the first inlet 11 and to the first outlet 21 of the mixing valve, and having a second partial circuit 2000, which is connected to the second inlet 12 and to the second outlet 22 of the mixing valve. Furthermore, for the purposes of illustrating the function, the flows of the heat transport medium in or through the mixing valve are indicated in FIG. 6.

Although exemplary embodiments have been explained in the above description, it should be pointed out that numerous modifications are possible. It should be noted, furthermore, that the exemplary embodiments are merely examples which are in no way intended to limit the scope of protection, the applications, and the structure. Instead, the above description gives a person skilled in the art a guideline for the realization of at least one exemplary embodiment, and various changes may be made here, with regard to the function and arrangement of the component parts described, without departing from the scope of protection resulting from the feature combinations equivalent thereto.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE DESIGNATIONS

11 First inlet
12 Second inlet
21 First outlet
22 Second outlet
100 Housing
200 Valve element
211 First branch
212 Second branch
213 Third branch
221 First cutout
222 Second cutout
223 Through passage
300 Seal
1000 First partial circuit
2000 Second partial circuit
D Axis of rotation

What is claimed is:

1. A mixing valve for a heat transport medium circuit, the mixing valve comprising:
    a housing, further comprising:
        a first inlet;
        a second inlet;
        a first outlet;
        a second outlet;
    a valve element, arranged adjustably at least partially in the housing, the valve element further comprising:
        a first fluid passage;
        a second fluid passage;
        a first position, and in the first position of the valve element, the first fluid passage connects the first inlet to the first outlet, and the second fluid passage connects the second inlet to the second outlet;

a second position, and in the second position of the valve element, the first fluid passage connects the first inlet to the second outlet, and the second fluid passage connects the second inlet to the first outlet; and a third position, and in the third position of the valve element, the first fluid passage connects the first inlet to the first outlet and to the second outlet, and the second fluid passage connects the second inlet to the first outlet and to the second outlet;

a fourth position, and when the valve element is in the fourth position, the first fluid passage connects the first inlet to the first outlet and to the second outlet, and the second fluid passage connects the second inlet to the first outlet and to the second outlet;

a minimum cross section, through which flow may pass, between the first inlet and the first outlet is smaller in the fourth position of the valve element than in the first position and the third position of the valve element;

a minimum cross section, through which flow may pass, between the first inlet and the second outlet is smaller in the fourth position of the valve element than in the second position of the valve element and greater in the fourth position of the valve element than in the third position of the valve element;

a minimum cross section, through which flow may pass, between the second inlet and the second outlet is smaller in the fourth position of the valve element than in the first position and the third position of the valve element; and a minimum cross section, through which flow may pass, between the second inlet and the first outlet is smaller in the fourth position of the valve element than in the second position of the valve element and greater in the fourth position of the valve element than in the third position of the valve element;

wherein the valve element is adjusted to the fourth position.

2. The mixing valve of claim 1, further comprising:
a minimum cross section, through which flow may pass, between the first inlet and the first outlet is smaller in the third position of the valve element than in the first position of the valve element;
a minimum cross section, through which flow may pass, between the first inlet and the second outlet is smaller in the third position of the valve element than in the second position of the valve element;
a minimum cross section, through which flow may pass, between the second inlet and the second outlet is smaller in the third position of the valve element than in the first position of the valve element; and
a minimum cross section, through which flow may pass, between the second inlet and the first outlet is smaller in the third position of the valve element than in the second position of the valve element.

3. The mixing valve of claim 1, the first fluid passage further comprising:
a first branch, wherein in the first, second and third positions of the valve element, the first branch is connected to the first inlet;
a second branch which, in the first and third positions of the valve element, the second branch is connected to the first outlet; and
a third branch which, in the second and third positions of the valve element, the third branch is connected to the second outlet.

4. The mixing valve of claim 3, wherein, in the fourth position of the valve element, the first branch is connected to the first inlet, the second branch is connected to the first outlet, and the third branch is connected to the second outlet.

5. The mixing valve of claim 1, the valve element further comprising:
an outer surface having a groove-like first cutout;
wherein, in the third position of the valve element, the groove-like first cutout connects the two inlets to one another, connects the two outlets to one another, or connects at least one of the inlets and at least one of the outlets to one another.

6. The mixing valve of claim 5, wherein, in the fourth position of the valve element, the groove-like first cutout connects the two inlets to one another, connects the two outlets to one another, or connects at least one of the inlets and at least one of the outlets to one another.

7. The mixing valve of claim 5, the outer surface of the valve element further comprising:
a groove-like second cutout connected to the groove-like first cutout by a through passage;
wherein, in at least one position of the valve element, the groove-like second cutout connects the two inlets to one another, connects the two outlets to one another, or connects at least one of the inlets and at least one of the outlets to one another.

8. The mixing valve of claim 7, wherein at least one portion of an outer surface of the valve element having an opening of the first branch, at least one portion of the outer surface of the valve element having an opening of the second branch, at least one portion of the outer surface of the valve element having an opening of the third branch, at least one portion of the outer surface of the valve element having the first cutout, and/or at least one portion of the outer surface of the valve element having the second cutout, is of rotationally symmetrical form.

9. The mixing valve of claim 7, wherein at least one portion of an outer surface of the valve element having an opening of the first branch, at least one portion of the outer surface of the valve element having an opening of the second branch, at least one portion of the outer surface of the valve element having an opening of the third branch, at least one portion of the outer surface of the valve element having the first cutout, and/or at least one portion of the outer surface of the valve element having the second cutout, is of spherical-segment-shaped form.

10. The mixing valve of claim 1, wherein the valve element is adjustable in continuously variable fashion.

11. The mixing valve of claim 1, the heat transport medium circuit further comprising:
a first partial circuit, which is connected to the first inlet and to the first outlet of the mixing valve; and
a second partial circuit, which is connected to the second inlet and to the second outlet of the mixing valve.

12. The mixing valve of claim 1, wherein the heat transport medium circuit the is part of a motor vehicle.

13. The mixing valve of claim 1, wherein the valve element is adjusted into the first position, the second position and the third position.

14. A mixing valve for a heat transport medium circuit, the mixing valve comprising:
a housing, further comprising:
a first inlet;
a second inlet;
a first outlet;
a second outlet;

a valve element, arranged adjustably at least partially in the housing, the valve element further comprising:
  a first fluid passage;
  a second fluid passage;
    a first position, and in the first position of the valve element, the first fluid passage connects the first inlet to the first outlet, and the second fluid passage connects the second inlet to the second outlet;
    a second position, and in the second position of the valve element, the first fluid passage connects the first inlet to the second outlet, and the second fluid passage connects the second inlet to the first outlet; and
    a third position, and in the third position of the valve element, the first fluid passage connects the first inlet to the first outlet and to the second outlet, and the second fluid passage connects the second inlet to the first outlet and to the second outlet;
  wherein in a further position of the valve element, the first fluid passage connects the first inlet only to the first outlet, and the second fluid passage connects the second inlet to the first outlet and to the second outlet; and/or in a further position of the valve element, the first fluid passage connects the first inlet only to the second outlet, and the second fluid passage connects the second inlet to the first outlet and to the second outlet; and/or in a further position of the valve element, the first fluid passage connects the first inlet to the first outlet and to the second outlet, and the second fluid passage connects the second inlet only to the first outlet; and/or in a further position of the valve element, the first fluid passage connects the first inlet to the first outlet and to the second outlet, and the second fluid passage connects the second inlet only to the second outlet.

15. A mixing valve for a heat transport medium circuit, the mixing valve comprising:
  a housing, further comprising:
    a first inlet;
    a second inlet;
    a first outlet;
    a second outlet;
  a valve element, arranged adjustably at least partially in the housing, the valve element further comprising:
    a first fluid passage;
    a second fluid passage;
      a first position, and in the first position of the valve element, the first fluid passage connects the first inlet to the first outlet, and the second fluid passage connects the second inlet to the second outlet;
      a second position, and in the second position of the valve element, the first fluid passage connects the first inlet to the second outlet, and the second fluid passage connects the second inlet to the first outlet; and
      a third position, and in the third position of the valve element, the first fluid passage connects the first inlet to the first outlet and to the second outlet, and the second fluid passage connects the second inlet to the first outlet and to the second outlet;
  wherein at least one of the inlets and at least one of the outlets are arranged so as to be offset with respect to one another by at least 45° in a direction of rotation about an axis of rotation of the valve element;
  wherein at least one of the inlets and at least one of the outlets are offset with respect to one another by at least 45° in a direction of revolution about an offset axis that is perpendicular to the axis of rotation of the valve element;
  wherein the axis of rotation of the valve element passes through at least one of the inlets and/or at least one of the outlets.

16. The mixing valve of claim 15, wherein the two inlets, the two outlets and/or at least one of the inlets and at least one of the outlets are arranged in a plane.

* * * * *